US011414051B2

(12) United States Patent
Hassani et al.

(10) Patent No.: US 11,414,051 B2
(45) Date of Patent: Aug. 16, 2022

(54) KEYED-ALIKE PHONE-BASED KEYS

(71) Applicant: FORD GLOBAL TECHNOLOGIES, LLC, Dearborn, MI (US)

(72) Inventors: Ali Hassani, Ann Arbor, MI (US); Ryan Edwin Hanson, Livonia, MI (US); Hamid M. Golgiri, Livonia, MI (US); Kevin Thomas Hille, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/013,118

(22) Filed: Sep. 4, 2020

(65) Prior Publication Data
US 2022/0073032 A1     Mar. 10, 2022

(51) Int. Cl.
*B60R 25/24*     (2013.01)

(52) U.S. Cl.
CPC ...... *B60R 25/241* (2013.01); *B60R 2325/101* (2013.01); *B60R 2325/103* (2013.01); *B60R 2325/108* (2013.01); *B60R 2325/205* (2013.01)

(58) Field of Classification Search
CPC ............ B60R 25/241; B60R 2325/108; B60R 2325/101; B60R 2325/205; B60R 2325/103; G07C 2009/00825; G07C 2009/00865; G07C 9/00571; G07C 9/27; G07C 2009/0088; G07C 9/28
USPC ................................................. 340/5.61, 5.72
See application file for complete search history.

(56) References Cited

U.S. PATENT DOCUMENTS

| | | | |
|---|---|---|---|
| 5,602,535 A * | 2/1997 | Boyles | B60R 25/24 307/10.1 |
| 9,238,450 B1 * | 1/2016 | Kleve | B60R 25/241 |
| 9,896,063 B2 | 2/2018 | Poma | |
| 2005/0184855 A1 * | 8/2005 | Burchette | B60R 25/252 340/5.53 |
| 2010/0268051 A1 * | 10/2010 | Prasad | A61B 5/14532 600/365 |
| 2011/0215901 A1 * | 9/2011 | Van Wiemeersch | B60R 25/04 340/5.54 |
| 2015/0235487 A1 * | 8/2015 | Proefke | G07C 9/20 340/5.61 |
| 2016/0203661 A1 * | 7/2016 | Pudar | G07C 9/00571 340/5.25 |
| 2016/0300417 A1 * | 10/2016 | Hatton | G07C 9/00857 |
| 2016/0318481 A1 * | 11/2016 | Penilla | B60L 53/80 |
| 2017/0166163 A1 * | 6/2017 | Poma | B60R 25/24 |

(Continued)

*Primary Examiner* — Edwin C Holloway, III
(74) *Attorney, Agent, or Firm* — Michael J. Spenner; Brooks Kushman P.C.

(57) ABSTRACT

A keyed-alike digital consumer access key is generated for distribution to a plurality of vehicles of a fleet. The keyed-alike digital consumer access key is deployed to the plurality of vehicles. The keyed-alike digital consumer access key is deployed to a mobile device. A request from a mobile device may be received to gain access to the plurality of vehicles. Responsive to validating the mobile device, the mobile device may be sent the keyed-alike digital consumer access key and a unique identifier corresponding to the mobile device, the keyed-alike digital consumer access key for use by the mobile device in authentication to one or more of the plurality of vehicles, the unique identifier for use by the mobile device in tracking which mobile device is accessing the one or more of the plurality of vehicles.

18 Claims, 4 Drawing Sheets

(56) References Cited

U.S. PATENT DOCUMENTS

2019/0025856 A1    1/2019   Turato et al.
2019/0206149 A1    7/2019   Sakurada et al.

* cited by examiner

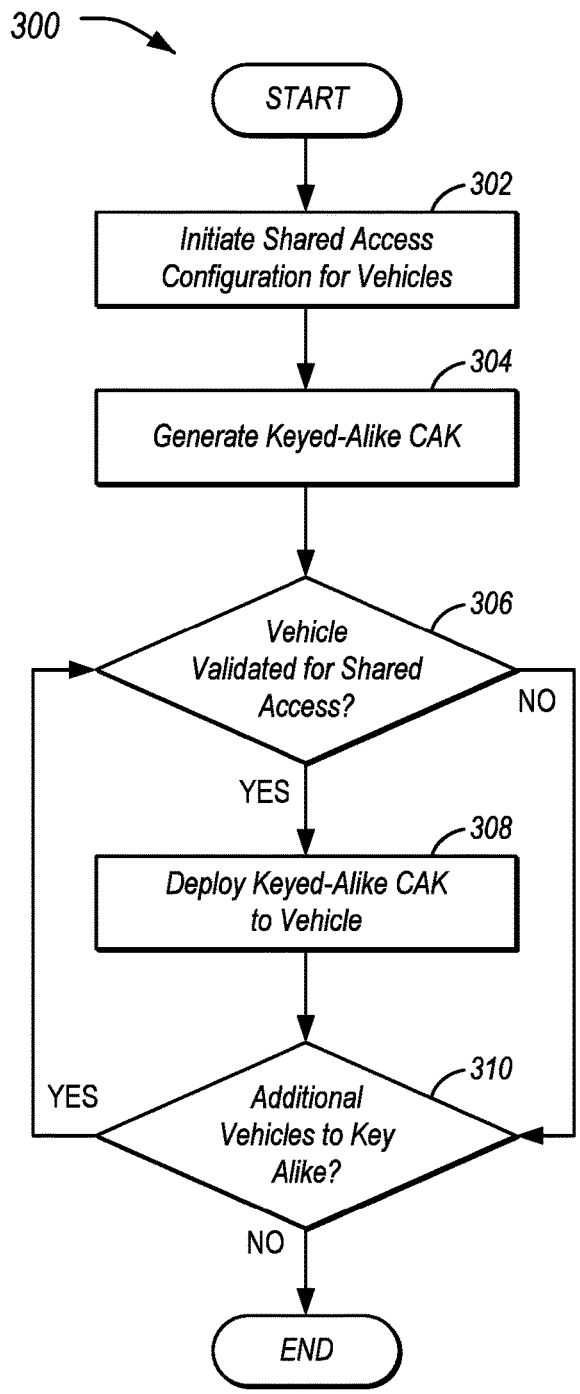
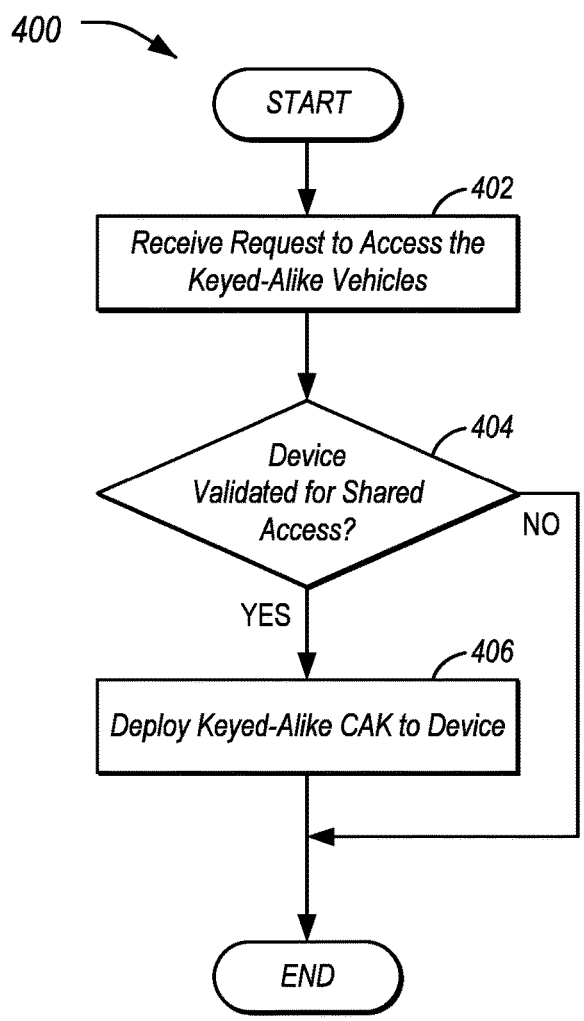
FIG. 3
FIG. 4

KEYED-ALIKE PHONE-BASED KEYS

TECHNICAL FIELD

Aspects of the present disclosure generally relate to phone based key (PBK) systems and methods for vehicle access, and, in particular, to keyed-alike vehicles, such as for use in fleet, service, and first responder applications.

BACKGROUND

Vehicle key fobs may be used to allow a user to gain access to a vehicle. Some fob devices operate such that when a key is pressed on the fob, the device sends a code to the vehicle to instruct the vehicle to unlock the vehicle. Passive-entry key fobs operate to provide response to a challenge pulse train sent by the vehicle, where, if a proper response is received by the vehicle, then the door may be unlocked by a user grasping the door handle. PBK systems allow users to utilize their phones to unlock a vehicle without requiring a key fob device. These systems may operate similar to a key fob, but where the phone communicates with the vehicle over BLUETOOTH or other wireless technologies.

SUMMARY

In one or more illustrative examples, a system for managing access to a fleet of vehicles is described. The system includes a server programmed to generate a keyed-alike digital consumer access key for distribution to a plurality of vehicles of a fleet; deploy the keyed-alike digital consumer access key to the plurality of vehicles; and deploy the keyed-alike digital consumer access key to a mobile device.

In one or more illustrative examples, a method for managing access to a fleet of vehicles is described. The method includes generating a keyed-alike digital consumer access key for distribution to a plurality of vehicles of a fleet; deploying the keyed-alike digital consumer access key to the plurality of vehicles; and deploying the keyed-alike digital consumer access key to a mobile device.

In one or more illustrative examples, a non-transitory computer-readable medium includes instructions for managing access to a fleet of vehicles is described. When executed by a processor of a server, the instructions cause the server to perform operations including to generate a keyed-alike digital consumer access key for distribution to a plurality of vehicles of a fleet; deploy the keyed-alike digital consumer access key to the plurality of vehicles; and deploy the keyed-alike digital consumer access key to a mobile device.

BRIEF DESCRIPTION OF THE DRAWINGS

FIG. 3 illustrates an example process for registering a vehicle for use with a keyed-alike consumer access key;

FIG. 4 illustrates an example process for requesting access to a shared vehicle key.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Figure 1:
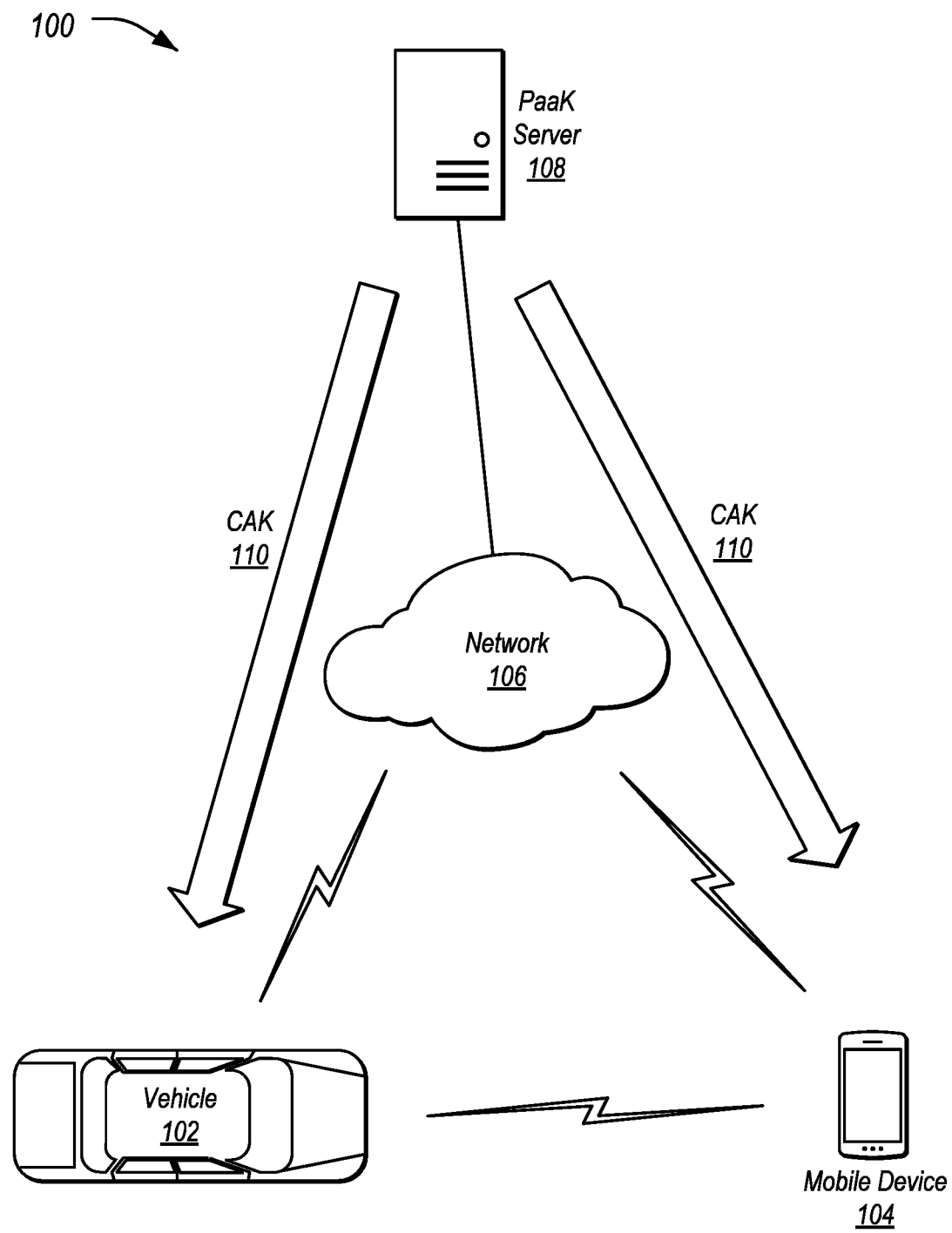
FIG. 1 illustrates an example system for distribution of a consumer access key.

FIG. 1 illustrates an example system for distribution of a Consumer Access Key (CAK) 110. PBK systems and methods perform user authentication through the usage of the CAK 110. In such a system, a phone-as-a-key (PaaK) server 108 may issue a CAK 110 to both a vehicle 102 and to a mobile device 104 for use in authentication. To perform the authentication, the vehicle 102 may confirm that the CAK 110 offered by the mobile device 104 matches or otherwise corresponds to a CAK 110 maintained by the vehicle 102. If so, access to the vehicle 102 may be granted to the user of the mobile device 104. If not, access may be denied.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a plurality of controllers configured to perform and manage various vehicle 102 functions under the power of the vehicle battery and/or drivetrain. As some non-limiting vehicle controller examples: a powertrain controller may be configured to provide control of engine operating components (e.g., idle control components, fuel delivery components, emissions control components, etc.) and for monitoring status of such engine operating components (e.g., status of engine codes); a body controller may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller may be configured to provide commands to control the powertrain, steering, or other aspects of the vehicle 102; a climate control management controller may be configured to provide control of heating and cooling system components (e.g., compressor clutch, blower fan, temperature sensors, etc.); a global positioning system (GPS) controller may be configured to provide vehicle location information; and a human-machine interface (HMI) controller may be configured to receive user input via various buttons or other controls, as well as provide vehicle status information to a driver, such as fuel level information, engine operating temperature information, and current location of the vehicle 102.

The vehicle bus may include various methods of communication available between the vehicle controllers, as well as between the telematics control unit (TCU) and the vehicle controllers. As some non-limiting examples, a vehicle bus may include one or more of a vehicle controller area network (CAN), an Ethernet network, and a media-oriented system transfer (MOST) network. Further aspects of the layout and number of vehicle buses are discussed in further detail below. The TCU may include network hardware configured to facilitate communication between the vehicle controllers and with other devices of the access control system 100. For example, the TCU may include or otherwise access a cellular modem configured to facilitate communication with other vehicles 102 or with infrastructure. The TCU may, accordingly, be configured to communicate over various protocols, such as with a communication network over a network protocol (such as Uu). The TCU may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained.

The mobile device 104 may further include various wireless transceivers, such as a BLUETOOTH or BLUETOOTH Low Energy (BLE) transceiver, as well as a transceiver for communication over the communications network 106. The communications network 106 may include one or more interconnected communication networks such as the Internet, a cable television distribution network, a satellite link network, a local area network, and a telephone network, as some non-limiting examples. The vehicle 102 may also include a TCU. The TCU may include network hardware configured to facilitate communication between the vehicle 102 and other devices of the access control system 100. For example, the TCU may include or otherwise access a cellular modem configured to facilitate communication with the communications network 106. The PaaK server 108 may be an example of a networked computing device that is accessible to the vehicle 102 and/or the mobile device 104 over the communications network 106.

The CAK 110 may be an encryption key configured for the vehicle 102 and the mobile device 104 to identify and authenticate each other for access to the vehicle. As shown, the CAK 110 is provided over the communications network 106 from the PaaK server 108 to a vehicle 102 and to a mobile device 104.

Figure 2:
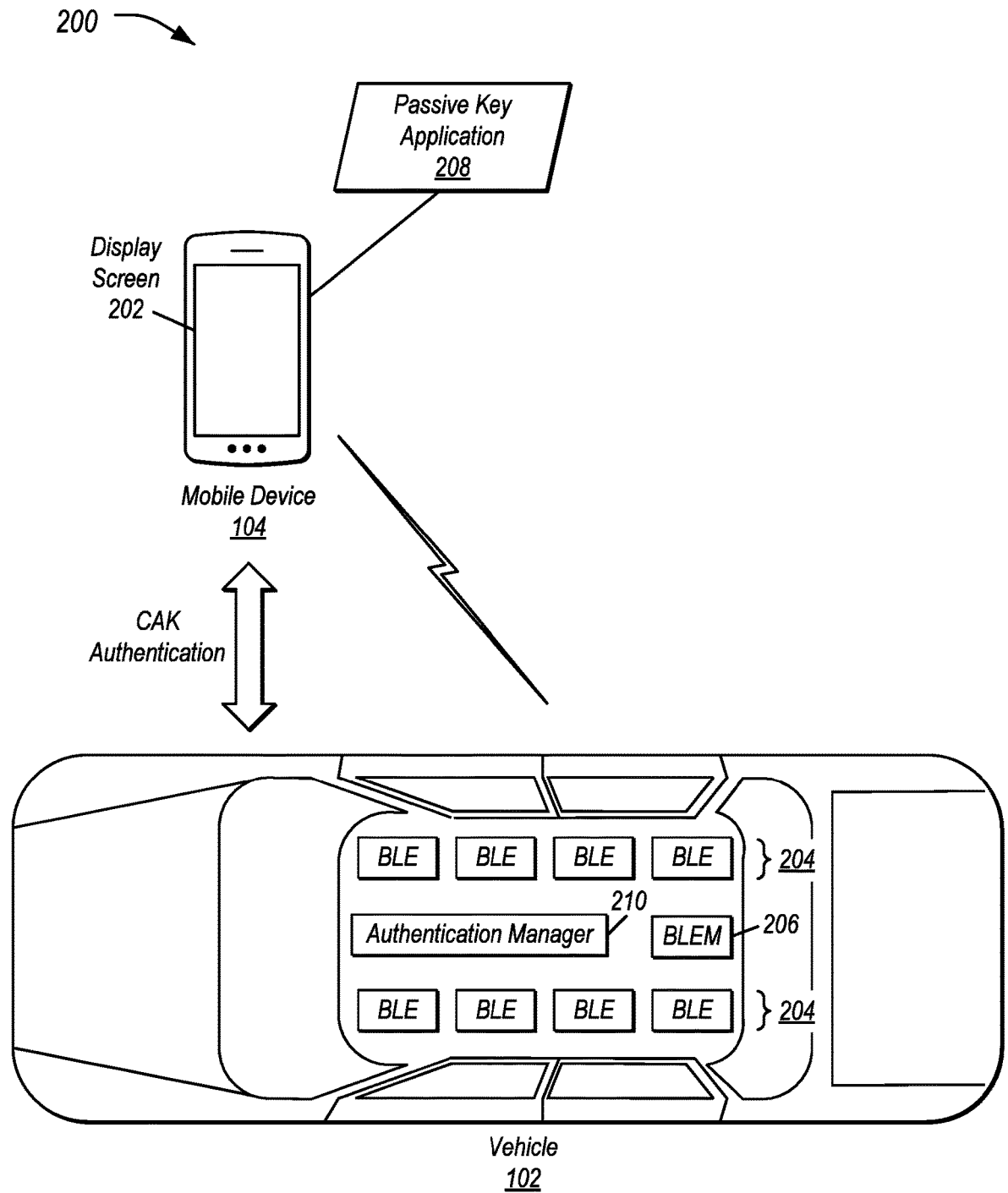
FIG. 2 illustrates an example portion of the access control system including further details of the vehicle and the mobile device.

FIG. 2 illustrates an example portion of the access control system 100 including further details of the vehicle 102 and the mobile device 104. As shown, the vehicle 102 may include an array of BLE transceivers 204 configured to facilitate communication between the mobile device 104 and the vehicle 102. For instance, each BLE transceiver 204 may be connected to one or more antennas to form an array that may be used to triangulate or otherwise detect the location of the mobile device 104. The BLE transceivers 204 may be controlled by a BLE module (BLEM) 206 including a memory and a processor programmed to send and receive messaging between the mobile device 104 and the vehicle 102, e.g., to provide for the performance of challenge-response sequences and/or to receive commands from the vehicle 102. In an example, a key fob may connect to the closest-detected BLE transceiver 204 to communicate with the BLEM 206 of the vehicle 102. As shown the vehicle 102 includes eight BLE transceivers 204, but it should be noted that implementations may include more or fewer transceivers and/or antennas.

The mobile device 104 may also include a display 202 configured to provide a user interface to a user. In some examples, the display 202 may be touch-sensitive, and may be further configured to receive input from the user. Additionally, a passive key application 208 may include instructions that, when executed by the one or more processors of the mobile device 104, cause the mobile device 104 to perform operations to facilitate access to the vehicle 102. In an example, the passive key application 208 may cause the mobile device 104 to display a user interface to the display 202 including controls similar to those of a key fob, e.g., lock, unlock, start, etc. In another example, the passive key application 208 may cause the mobile device 104 to interact as a passive entry device with the vehicle 102, providing presence information to the BLEM 206 that allows the vehicle 102 to detect that an authorized user of the vehicle 102 is nearby. By executing the passive key application 208 to control communication of the mobile device 104 with the BLEM 206 of the vehicle 102, the mobile device 104 may be used to unlock, start, or otherwise access the vehicle 102.

The passive key application 208 may allow for the authentication of the mobile device 104 to the vehicle 102 using an authentication manager 210 of the vehicle 102. The authentication manager 210 may include software that manages the authentication status of the keys to the vehicle 102 (including that of phone as a key). The authentication manager 210 may request other software services, based off of an authentication status, to trigger or drive the actions in the vehicle 102. This software may be executed by a controller of the vehicle 102 that is in communication with the BLEM 206, as well as with other components of the vehicle 102, such as door locks or vehicle ignition interlock. The authentication of the mobile device 104 to vehicles 102 may utilize a PaaK feature implementation, ensuring a secure connection between the user mobile device 104 and a vehicle connectivity module (such as the BLEM 206), whereby the user position can be localized utilizing the BLE transceiver 204 antennas. Moreover, the BLE link layer encryption adds communication security.

By using the CAK 110, access may be enabled to personally-owned and ride-share/vehicle-share vehicles 102. To manage access of a single user, the process of requesting a unique CAK 110, delivering it to the mobile device 104 and vehicle 102, and then establishing a secure session is sufficient. Complications, however, arise when considering fleet, service and first responders.

In these shared access use cases, such a protocol would dictate each user receiving their own key for each vehicle 102 separately. Inherently, this adds complexity on the user, the PaaK server 108, as well as on any organization managing access logistics. These issues may also be difficult when considering manufacturing plants, whereby drivers move around thousands of new vehicles 102 a week. While, in theory, a hardware key fob solves some of these issues, that both adds cost (fob and associated vehicle hardware) and may be impractical when considering autonomous vehicle technicians who desire quick access to vehicles 102 spread across a geographic service area.

As such, a special CAK 110 may be provided for shared access. A keyed-alike CAK 110 may be utilized where shared access vehicles 102 may support a common digital key. This keyed-alike CAK 110 may be provided on a vehicle level or on a fleet level, depending on the level of shared access desired. For tracking purposes, the driver or occupant of the vehicle 102 may further provide a secondary identification token that is independent of the keyed-alike CAK 110. This would enable shared vehicle 102 use cases while still being able to associate usage with a given vehicle 102 an/or vehicle 102 occupant.

This approach may be done as either a pure connection or bonded session. If just connecting with the vehicle 102, the keyed-alike CAK 110 is sufficient. If establishing a bonded session is required, out-of-band pairing could be conducted to simplify their process. This may include performing an near-field communication (NFC) tap between mobile device 104 and the vehicle 102, as well as doing a cloud-based BLE encryption key distribution.

FIG. 3 illustrates an example process 300 for registering a vehicle 102 for use with a keyed-alike CAK 110. In an example, the process 300 may be performed by the PaaK server 108 in the context of the access control system 100 described herein.

At operation 302, the PaaK server 108 receives a request for shared access to a vehicle 102. In an example, to set up a vehicle 102 for use with a keyed-alike CAK 110, a user in control of the vehicle 102 (e.g., a fleet operator, owner, or individual) may register the vehicle 102 as a shared access type with the PaaK server 108. As a possibility, the user may access a user interface of the PaaK server 108 to register the vehicle 102 using the mobile device 104. The user may also create an account and security protocol to restrict future request access (e.g., enter a password for use with a registration number for the vehicle 102, add a secret question and answer to confirm eligibility for using the vehicle 102, etc.). After operation 302, control proceeds to operation 306.

At operation 304, the PaaK server 108 generates a keyed-alike CAK 110 for the vehicle 102. In an example, the key may be generated responsive to creation of the account for the vehicles 102 to be keyed account. After operation 304, control proceeds to operation 306.

At operation 306, the PaaK server 108 validated the registration of the vehicle 102 for shared access. In an example, the PaaK server 108 may require a security challenge to be validly responded to, such as the presence of a physical key (e.g., key fob or NFC card) in the vehicle 102 being communicated to the PaaK server 108. In another example, registration of the vehicle 102 may require specific access configuration information to be set for the vehicle 102 (e.g., the vehicle 102 may be required to be set to a mode such as police interceptor, autonomous vehicle (AV), or vehicles 102 in plant mode). If the vehicle 102 is validated for deployment, control passes to operation 308. Otherwise, control passes to operation 310.

At operation 308, the keyed-alike CAK 110 is deployed to the vehicle 102. Once deployed, the keyed-alike CAK 110 may be available for use in validating mobile devices 104 with the vehicle 102. After operation 308, control proceeds to operation 310.

At operation 310, the PaaK server 108 determines whether additional vehicles 102 are to be keyed alike. In general, if a vehicle 102 is intended to be a single shared vehicle 102, only a one-time account registration is done. If, however, the user intends to make a vehicle 102 that is keyed alike to other vehicles 102, each subsequent vehicle 102 may also be registered to the same specific account. This process may be automated based off VIN or other vehicle 102 identifier. A list of such identifiers may be provided to the PaaK server 108. For instance, automation may be useful where corporations or manufacturing plants could automatically register their vehicles 102 to be keyed alike as they are received and/or built. Conversely, while not shown in FIG. 3, deregistration may also be automated, where, in an example, changing a vehicle 102 out of plant mode may be a trigger for deregistration. If additional vehicles 102 are to be keyed alone using the keyed-alike CAK 110, control returns to operation 306 to address those additional vehicles 102. If no additional vehicles 102 are to be keyed alike, the process 300 ends. It should be noted, however, that more vehicles 102 may be keyed alike later. For instance, the user could log back into the account created at operation 302 at a later time and add additional vehicles 102 to be keyed alike.

FIG. 4 illustrates an example process 400 for requesting access to a shared vehicle 102 key. In an example, the process 400 may be performed by the PaaK server 108 in the context of the access control system 100, including the mobile device 104.

At operation 402, the PaaK server 108 receives a request to access the keyed-alike CAK 110. In an example, the user requesting the access may utilize the passive key application 208 of the mobile device 104 to communicate with a shared access portal of the PaaK server 108 and may access the account for the shared vehicle 102 using a registration name and password corresponding to the account of the vehicle 102 (e.g., the account having been set up using the process 300). After operation 302, the process continues to operation 404.

At operation 404, the PaaK server 108 validates the request. In an example, the PaaK server 108 may confirm that the entered account information matches that of the vehicle 102 to which the user is requesting access. If the request is validated, control passes to operation 406. If not, the process 400 ends.

At operation 406, the PaaK server 108 sends the keyed-alike CAK 110 to the mobile device 104. Moreover, to allow for tracking of the user (as each user has the same keyed-alike CAK 110), the PaaK server 108 may generate a generated universally unique identifier corresponding to the user of the mobile device 104, and may send that generated universally unique identifier to the mobile device 104 as well to track access of the user of the mobile device 104 to the vehicle 102. Once received, the user may utilize the mobile device 104 to access the vehicle 102. After operation 406, the process 400 ends.

Variations on the process 400 are possible. For instance, the process 400 may be simplified to support first responders by having an owner grant access to specific organizations. For instance, a fire department may generically have an account registration number, such that the organization could generically provide access to anyone who downloads the passive key application 208 and logs into the PaaK server 108 under that registration number or account.

As the keyed-alike CAK 110 would be the same among the mobile devices 104, the universally unique identifier, may be useful for tracking. For instance, this identifier may be passed to the vehicle 102 responsive to success of the digital key challenge between the mobile device 104 and the vehicle 102 performed using the keyed-alike CAK 110. This additional identifier may, for example, allow the vehicle 102 to associate the authorized mobile device 104 with a cloud or local account.

Cloud accounts, such as for logistics tracking, may be actively or passively tracked. Active tracking may involve a real time query-based approach, where a logistics manager may request the current behavior of a specific user and/or vehicle 102. Passive tracking may involve a recording-based approach, where the vehicles 102 record data defined by the logistics manager and continuously upload that data to a cloud account for the respective vehicle 102. If the vehicles 102 do not have connectivity, this may be locally stored and then acquired, e.g., via bus query via a diagnostic tool or by transferring the data onto a storage device (e.g., a flash drive connected to the in-vehicle infotainment system). For instance, the PaaK server 108 may receive a request including an identifier of one of the plurality of vehicles 102, query the one of the plurality of vehicles 102 for information (e.g., the data records defined by the logistics manager); and provide, the information responsive to the request, the information including a unique identifier corresponding to a mobile device 104 having accessed the one of the plurality of vehicles 102.

Embedded controls with respect to the capabilities of the user, such as personalization and permissions tracking, may involve a personal profile being downloaded with the associated keyed-alike CAK 110. The vehicle 102 may then enforce the expected behaviors accordingly for the user of the mobile device 104.

Optionally, keyed-alike CAKs 110 may be revoked and re-deployed. This may be done, for instance, on an automatic basis or manually triggered from a web interface or administrator application. For example, the keyed-alike CAK 110 may be revoked and redeployed to the vehicles 102 and the mobile devices 104 every period of time (e.g., two weeks, one month, three month, etc.) or responsive to a request to cycle to a new keyed-alike CAK 110.

The mobile devices 104 that receive a new keyed-alike CAK 110 may also be managed from the web interface or administrator application. For example, if a fleet operator decides that a first subset of the mobile devices 104 are still valid (e.g., phones 1-14), but another subset are not (e.g., phones 15-20), the fleet operator may utilize the web interface or administrator application to revoke all keys and then re-deploy fresh keyed-alike CAKs 110 only to the first subset of the mobile devices 104 (e.g., phones 1-14).

Alternatively, upon re-deployment, each mobile device 104 may be required to re-perform a security challenge, such as the presence of a physical key (e.g., a key fob or NFC card) in vehicle 102. For instance, the vehicle 102 may receive a challenge message from the PaaK server 108, and may forward the challenge to the physical key or otherwise request information from the physical key and respond to the PaaK server 108 with a response based on information received from the physical key. Accordingly, if a malicious user was able to acquire a valid keyed-alike CAK 110 at some point, that user would not be able to get one again without passing a security check.

Figure 5:
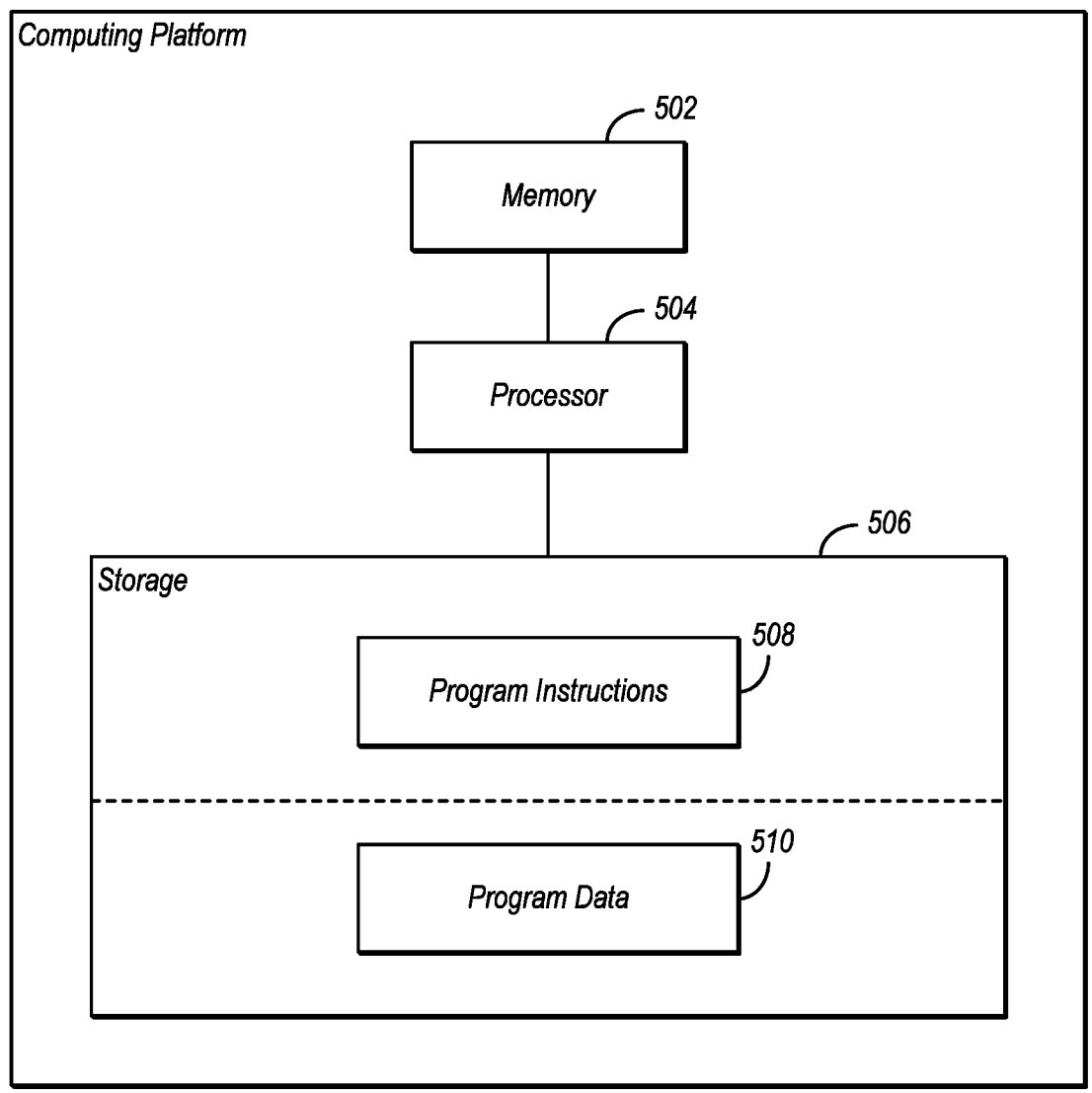
FIG. 5 illustrates an example computing device for the use with keyed-alike Consumer Access Keys (CAKs).

FIG. 5 illustrates an example computing device 500 for the use with keyed-alike CAKs 110. Devices discussed herein, such as the vehicle 102, mobile device 104, and PaaK server 108 may include devices such as the computing device 500. Likewise, the operations performed herein, such as those of the processes 300 and 400, may be implemented with such a computing device 500. The computing device 500 may include memory 502, processor 504, and non-volatile storage 506. The processor 504 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 502. The memory 502 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 506 may include one or more persistent data storage devices such as a hard drive, optical drive, tape drive, non-volatile solid-state device, cloud storage or any other device capable of persistently storing information.

The processor 504 may be configured to read into memory 502 and execute computer-executable instructions residing in program instructions 508 of the non-volatile storage 506 and embodying algorithms and/or methodologies of one or more embodiments. The program instructions 508 may include operating systems and applications. The program instructions 508 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 504, the computer-executable instructions of the program instructions 508 may cause the computing device 500 to implement one or more of the algorithms and/or methodologies disclosed herein. The non-volatile storage 506 may also include data 510 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for managing access to a fleet of vehicles, comprising:
    a server programmed to:
        generate a keyed-alike digital consumer access key for distribution to a plurality of vehicles of a fleet;
        deploy the keyed-alike digital consumer access key to the plurality of vehicles;
        receive a request from a mobile device to gain access to the plurality of vehicles;
        responsive to validating the mobile device, send the mobile device the keyed-alike digital consumer access key and a unique identifier corresponding to the mobile device, the keyed-alike digital consumer access key configured to be used by the mobile device to authenticate the mobile device to the plurality of vehicles, the unique identifier configured to be used by the mobile device to track which mobile device is accessing the plurality of vehicles;
        receive a second request including an identifier of one of the plurality of vehicles;
        query the one of the plurality of vehicles for information; and
        provide, the information responsive to the second request, the information including the unique identifier corresponding to the mobile device having accessed the one of the plurality of vehicles.

2. The system of claim 1, wherein the server is further programmed to receive a request from a fleet administrator to generate and deploy the keyed-alike digital consumer access key.

3. The system of claim 1, wherein the server is further programmed to access a listing of table identifiers to identify the plurality of vehicles to which to deploy the keyed-alike digital consumer access key.

4. The system of claim 1, wherein the server is further programmed to periodically:
    revoke the keyed-alike digital consumer access key;
    generate a new keyed-alike digital consumer access key; and
    deploy the new keyed-alike digital consumer access key to the plurality of vehicles; and
    deploy the new keyed-alike digital consumer access key to the mobile device responsive to the mobile device performing a security challenge.

5. The system of claim 1, wherein the server is further programmed to, responsive to receipt of an indication that one of the plurality of vehicles is no longer a fleet vehicle, automatically revoke the keyed-alike digital consumer access key from the one of the plurality of vehicles.

6. The system of claim 1, wherein the server is further programmed to validate a vehicle for addition to the plurality of vehicles responsive to a security challenge sent to the vehicle from the server being validly responded to by the vehicle, the security challenge including confirming presence of a physical key in the vehicle.

7. The system of claim 6, wherein the physical key is a key fob or an NFC card.

8. A method for managing access to a fleet of vehicles, comprising:
generating a keyed-alike digital consumer access key for distribution to a plurality of vehicles of a fleet;
deploying the keyed-alike digital consumer access key to the plurality of vehicles;
receiving a request from a mobile device to gain access to the plurality of vehicles;
responsive to validating the mobile device, sending the mobile device the keyed-alike digital consumer access key and a unique identifier corresponding to the mobile device, the keyed-alike digital consumer access key configured to be used by the mobile device to authenticate the mobile device to the plurality of vehicles, the unique identifier configured to be used by the mobile device to track which mobile device is accessing the plurality of vehicles;
receiving a second request including an identifier of one of the plurality of vehicles:
querying the one of the plurality of vehicles for information; and
providing, the information responsive to the second request, the information including the unique identifier corresponding to the mobile device having accessed the one of the plurality of vehicles.

9. The method of claim 8, further comprising receiving a request from a fleet administrator to generate and deploy the keyed-alike digital consumer access key.

10. The method of claim 8, further comprising accessing a listing of table identifiers to identify the plurality of vehicles to which to deploy the keyed-alike digital consumer access key.

11. The method of claim 8, further comprising periodically:
revoking the keyed-alike digital consumer access key;
generating a new keyed-alike digital consumer access key;
deploying the new keyed-alike digital consumer access key to the plurality of vehicles; and
deploying the new keyed-alike digital consumer access key to the mobile device responsive to the mobile device performing a security challenge.

12. The method of claim 8, further comprising, responsive to receipt of an indication that one of the plurality of vehicles is no longer a fleet vehicle, automatically revoking the keyed-alike digital consumer access key from the one of the plurality of vehicles.

13. The method of claim 8, further comprising validating a vehicle for addition to the plurality of vehicles responsive to a security challenge sent to the vehicle being validly responded to by the vehicle, the security challenge including confirming presence of a physical key in the vehicle.

14. A non-transitory computer-readable medium comprising instructions for managing access to a fleet of vehicles, that, when executed by a processor of a server, cause the server to perform operations including to:
generate a keyed-alike digital consumer access key for distribution to a plurality of vehicles of a fleet;
deploy the keyed-alike digital consumer access key to the plurality of vehicles;
receive a request from a mobile device to gain access to the plurality of vehicles;
responsive to validating the mobile device, send the mobile device the keyed-alike digital consumer access key and a unique identifier corresponding to the mobile device, the keyed-alike digital consumer access key configured to be used by the mobile device to authenticate the mobile device to the plurality of vehicles, the unique identifier configured to be used by the mobile device to track which mobile device is accessing the plurality of vehicles;
receive a request including an identifier of one of the plurality of vehicles;
query the one of the plurality of vehicles for information; and
provide, the information responsive to the request, the information including the unique identifier corresponding to the mobile device having accessed the one of the plurality of vehicles.

15. The medium of claim 14, further comprising instructions that, when executed by the processor of the server, cause the server to perform operations including to access a listing of table identifiers to identify the plurality of vehicles to which to deploy the keyed-alike digital consumer access key.

16. The medium of claim 14, further comprising instructions that, when executed by the processor of the server, cause the server to perform operations including to periodically:
revoke the keyed-alike digital consumer access key;
generate a new keyed-alike digital consumer access key;
deploy the new keyed-alike digital consumer access key to the plurality of vehicles; and
deploy the new keyed-alike digital consumer access key to the mobile device responsive to the mobile device performing a security challenge.

17. The medium of claim 14, further comprising instructions that, when executed by the processor of the server, cause the server to perform operations including to, responsive to receipt of an indication that one of the plurality of vehicles is no longer a fleet vehicle, automatically revoke the keyed-alike digital consumer access key from the one of the plurality of vehicles.

18. The medium of claim 14, further comprising instructions that, when executed by the processor of the server, cause the server to perform operations including to validate a vehicle for addition to the plurality of vehicles responsive to a security challenge sent to the vehicle from the server being validly responded to by the vehicle, the security challenge including confirming presence of a physical key in the vehicle.

* * * * *